No. 801,859. PATENTED OCT. 17, 1905.
W. E. EVERETTE.
METHOD OF PRESERVING WOOD.
APPLICATION FILED APR. 9, 1904.
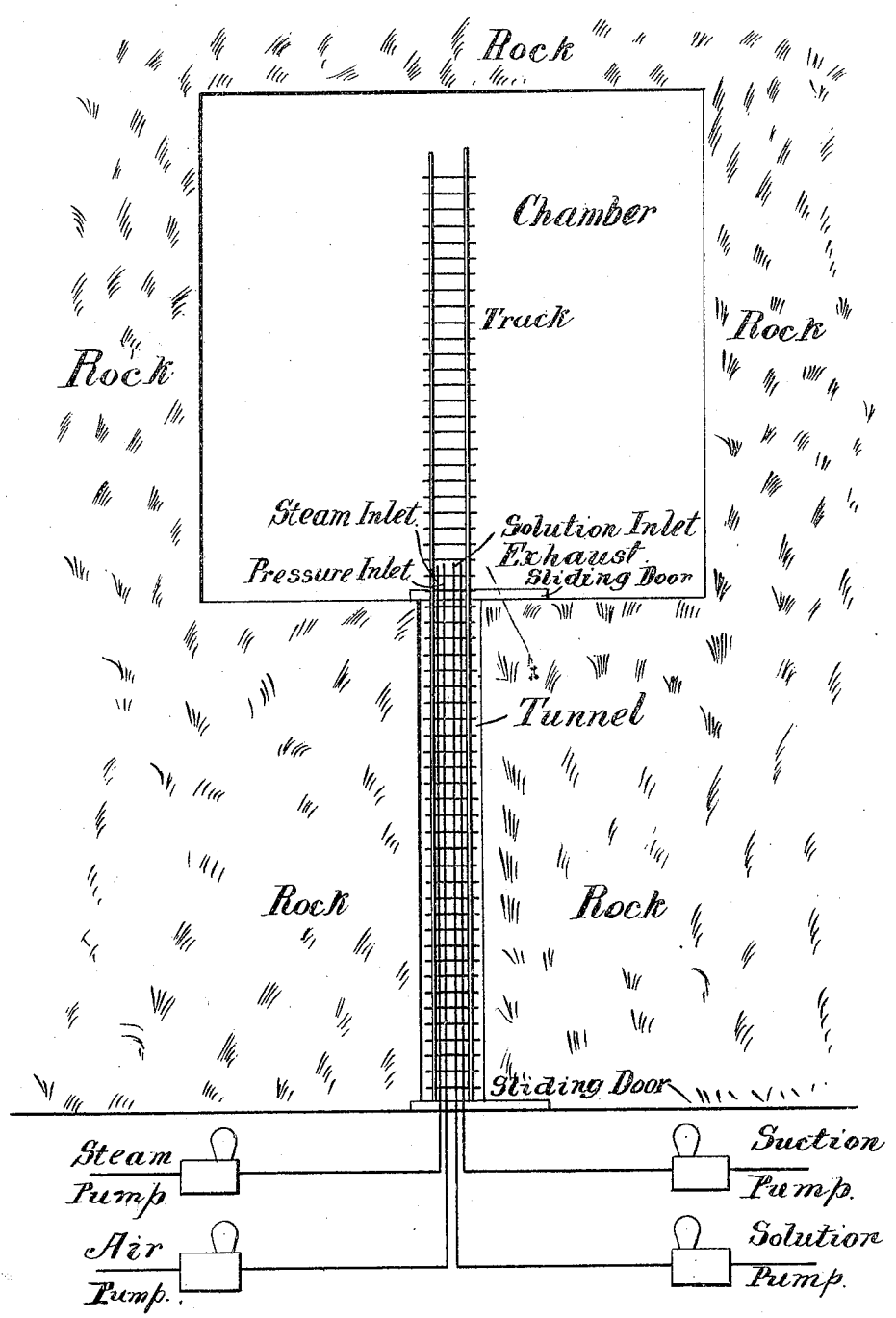

UNITED STATES PATENT OFFICE.

WILLIS EUGENE EVERETTE, OF TACOMA, WASHINGTON.

METHOD OF PRESERVING WOOD.

No. 801,859.      Specification of Letters Patent.      Patented Oct. 17, 1905.

Application filed April 9, 1904. Serial No. 202,359.

*To all whom it may concern:*

Be it known that I, WILLIS EUGENE EVERETTE, a citizen of the United States, and a resident of Tacoma, in the county of Pierce and State of Washington, have invented certain new and useful Improvements in Methods of Preserving Wood, of which the following is a specification.

The object of my invention is to prepare wood and other cellulose materials so that it may resist the attack of various insects and animals, especially the teredo, limnoria, and white ant, and at the same time render said material flame-proof.

While my invention is applicable with great advantage to wood and other fibrous or cellulose material in a great variety of forms and for many commercial, constructive, and other purposes, it is especially designed to protect spiles used in wharves, piers, bridges, stockades, &c., against destruction by the teredo and other water or earth animals or insects.

The fireproof or flame-proof character of the wood, timber, paper, or other cellulose material treated by my method, as well as its resistance to moisture, weather, and other destructive agencies, are the secondary and natural results of the preserving treatment applied, while the specific preservation against attack of insects and certain animals of the air, water, and earth is based upon my discovery of the cause of such attacks.

Take the teredo, for example. It is a well-known fact that spiles used in building wharves and piers, especially on the Pacific Coast, are short-lived, more especially in certain localities, such as parts of Puget Sound, owing to the fact that the teredo and limnoria attack the wood for the purpose of food and bore a tortuous channel through the wood in every direction, secreting lime from the salt water as they go, and thereby lining the walls of the hole with a thin crust of lime, which prevents and protects the teredo from attack by other teredo and minute fish, the teredo itself being a soft-bodied mollusk, commonly called a "chip-worm" or "sea-worm," about an inch to three inches in length. When a spile has been attacked by a large number of these teredos, it is soon honeycombed with small channels running in all directions and interlacing with each other, but not cutting each other, owing to the presence of the lime coating, and in some specimens which I have examined the wood in parts of the spile has entirely disappeared, leaving only a mass of small white lime tubes in its place.

I have discovered by analysis of the stomach of the teredo that by decomposition the cellulose of the wood is converted into sugar, and the first object of my invention, therefore, as applied to the preservation of spiles and other wood or cellulose material which have to be submerged in salt water is to render the cellulose insoluble without destroying the tensility of the interior of the wood. I have discovered that wood the cellulose of which has been rendered insoluble by my improved process will not be attacked by the teredo. On the other hand, the limnoria, minute worm-like creatures with about the dimensions of a needle, attack the surface of the spile in myriads. This surface, somewhat softened by the action of the salt water, yields readily to the quasi-boring motion of these limnoria, which, unlike the teredo, do not enter the wood to stay there permanently, but simply feed upon its contents.

On land the chief insect enemy of the wood is the pseudoneuropterous insect, commonly called the "white ant," which attacks the wood for food by biting with sharp mandibles and softening the mouthful by an acid secretion analogous to sulfuric and formic acids. In order to protect the wood against attacks of this character, as also against destruction by fungus and other fungoid growths, dry-rot, weather conditions, and other destructive tendencies, the second object of my invention is to harden the exterior of the wood to such a degree as to be impervious to all such attacks from both a chemical and physical point of view.

My improved process not only accomplishes these two objects in the case of logs, spiles, and other forms of cellulose material, whether used for wharves, piers, bridges, cribs, railroad-ties, telegraph-poles, timber for ships and other building purposes, but incidentally renders the surface flame-proof, from the fact that it will not ignite until the surface has actually reached a condition of incandescence, which requires a temperature of about 900° Fahrenheit. Also incidental to the process the surface of the material treated assumes a beautiful white, black, yellow, or red polish, according to the materials used, and can therefore be used for flame-proof, decorative, or ornamental purposes, such as the interior on shipboard, railway-cars, theaters, and even for shingling. On a smaller scale the process may be applied with the same preserving and flame-proof effects to paper, cotton fabric, and ropes, or other fibrous or cellulose materials.

As an example of my improved process I will describe the treatment which I have found preferable and most effective as applied to spiles, such as are employed for building wharves, it being understood that the same treatment on a smaller scale may be applied to less difficult objects, for which smaller quantities and less pressure than those hereinafter named will suffice.

A diagrammatic drawing accompanying this specification shows a preferred arrangement of a plant adapted to treat spiles in considerable quantities.

The ordinary log (commonly called a "spile") is generally from forty-five to ninety feet long and thick in proportion. To treat the entire surface of such a spile, therefore, at one operation requires a chamber or receptacle about a hundred feet long. As it is desirable for economic reasons to treat a considerable number of such spiles at the same time, I have found it best to construct a chamber about one hundred feet square and about twenty feet high, which enables me to treat two hundred and fifty spiles as a single charge. Instead of forming this chamber as part of a building, which would require a large outlay and would have to be very strongly built to resist the expansive force of the pressure employed, I prefer when practicable to take advantage of the fact that wooded country containing timber large enough for spiles often contains cliffs or hills of solid rock in which such chambers may be hewn and when hewn will become a permanent self-sustained structure. This chamber should be located sufficiently within the rock to have a permanent and indestructible covering of rock and earth to prevent any possible breaking down of the walls, and it is to be connected to the outer air by a tunnel, preferably about a hundred feet long and of a height and width to accommodate an ordinary railway-truck with a load of spiles. These spiles are usually set upon trivets, so arranged that sixteen spiles make a load. Obviously the chamber must be air-tight and water-tight, and it is preferably lined with lead or other suitable material capable of resisting the chemicals which are used in the treatment of the wood. Both ends of the tunnel are to be protected by an air-tight door or portal, preferably of iron, and equipped with suitable automatic valves.

Before placing the spiles in the chamber they are to be thoroughly decorticated and cleaned in any suitable and convenient manner. They are then to be conveyed into the chamber, preferably on truck-cars, sixteen at a time, and placed in rows, separated and sustained by trivets, so as to be accessible and subject to air-pressure from all sides. As before stated, two hundred and fifty spiles of ninety-foot length can be thus accommodated as a charge.

The first step is to apply, by means of compressed air from suitable machinery placed outside the chamber, a pressure of about four thousand to six thousand pounds to the square inch, continuing the pressure for about an hour. The purpose of this is to disturb the cellular structure of the wood to a depth of several inches, whereby the sap and lighter resins are to some extent freed from the cells, so that when the pressure is withdrawn they exude to the surface. The air-pressure is now to be gradually lowered to normal and afterward exhausted, thus drawing off substantially all the sap and lighter resins, which fall to the floor of the chamber when they exude from the wood.

The next step of the process is to fill the chamber with compressed air previously heated to about 240° Fahrenheit and preferably by passing it through red-hot pipes and hold it in the chamber at about four thousand pounds pressure for about two hours, by which time all the surface moisture of the wood and part of that in the deep interior of the wood has been converted into steam, dissolving the gums and sticky heavy resins, which, thus lixiviated, are then to be exhausted through the tunnel, the exhaustion being carried to substantial vacuum, by which process the wood is made clean, as if by boiling, which, in fact, is the real nature of this part of the process. After holding the chamber in this exhausted condition for about an hour I then blow in a saturated solution of an acetate of iron, lead, calcium, aluminium, or magnesia, or of two or more of these acetates. A preferable compound solution would be in about the proportion of equal portions of the acetates of iron and calcium, half portions of the acetates of aluminium and magnesia, and a tenth portion of the acetate of lead. A preferable simple solution would be that of the acetate of aluminium. This solution as a boiling aqueous solution completely fills the chamber and, in addition to its normal tendency to penetrate the interstices of the wood, is to be driven forcibly in by again applying the pressure of about four thousand pounds to the square inch by means of compressed air for a period of about twelve hours. At the end of this time the unabsorbed solution is to be drawn off and a new solution blown in, composed of about one part ammonia, one part liquid carbonic acid, and two parts water, so as to fill the chamber again. By the aid of renewed pressure of about four thousand pounds, which is to be continued for about six hours, the acetates of iron, lead, and aluminium which have been absorbed by the wood are changed to insoluble carbonates and hydroxids. While the heat of the boiling before the introduction of this second solution may affect the acetate solution somewhat, it will be only a transient effect and will not interfere with the chemical reaction desired, which may be thus stated, taking as an example for clearness the simple solution of acetate of aluminium. In the interior of the opened cells of the exterior of the wood the solution of acetate of aluminium, $Al_2(C_2H_3O_2)$, and water ($H_2O$) when submerged by the solution of carbon dioxid in water ($CO_2+H_2O$) and concentrated ammonium hydroxid ($NH_3+H_2O$) throws down an insoluble precipitate of carbonate of aluminium ($Al_2CO_3$) and an insoluble precipitate of hydroxid of aluminium, ($Al_2HO_3$,) giving off into solution carbonate of ammonia ($NH_4CO_3$) and ammonium acetate, $NH_4(C_2H_3O_2)$. The pressure is now to be reduced to normal and a boiling aqueous solution of any desired soluble alkaline silicate, such as a silicate of soda or potash, is to be blown in and the usual pressure of four thousand pounds again applied for about two hours, whereby any remaining unchanged acetates of magnesia and calcium form insoluble silicates and oxysilicates. The solution unused is now drawn off and simple boiling water sent in to wash out all the soluble alkaline silicates which may happen to remain, after which the water is to be withdrawn and the chamber filled with compressed air heated to 240° Fahrenheit. This air is to be allowed to escape gradually, so as to thoroughly dry out the treated wood, which will take about six hours. The surface of the wood is now of a beautiful white, red, yellow, or black color, depending upon which mineral salt was used in excess, and may be polished to give a shiny marble or stone-like surface. The interior of the wood will be found to retain its tensile character and to be substantially unaffected by the treatment, while the exterior has become so hard that it cannot be cut by the teeth of the white ant or any other insect or small animal, while it is also flame-proof and weatherproof. At the same time the cellulose matter has become indigestible by the teredo and limnoria.

It will be readily understood that the duration of this process renders it highly desirable to treat large quantities of material at a time, but when so treated it will be found that the process is a very economical one compared with permanent benefits derived from it. When ordinary timber, railroad-ties, blocks, ropes, logs, papers and various fibrous matters are selected in place of spiles, the treatment can be obviously carried on on a smaller scale.

I claim—

1. The method of preserving wood and other cellulose or fibrous materials which consists: first, in setting free and exhausting the sap and resins to a desired depth of surface, second, lixiviating under heat and pressure, third, forcing into the interstices of the material a solution compounded of suitable acetates, fourth, causing precipitation of carbonates and hydroxids by means of an aqueous solution of ammonia and carbon dioxid; fifth; adding an aqueous solution of an alkaline silicate and finally drawing off the remaining unabsorbed solution and drying the material for commercial use.

2. The method of preserving wood and other cellulose or fibrous materials which consists first, in setting free and exhausting the sap and resins to a desired depth of surface, second, lixiviating under heat and pressure, third, forcing a solution of a suitable acetate into the interstices of the material, fourth, converting the acetate while still in the material into carbonates and hydroxids by means of an aqueous solution of ammonia and carbonic acid; fifth, converting a portion of the hydroxid into insoluble silicates and oxysilicates by means of an aqueous solution of an alkaline silicate, and finally exhausting any soluble matter that may remain, and drying the material for commercial use.

WILLIS EUGENE EVERETTE.

Witnesses:
ANNA H. VAN HORENBERG,
W. P. PREBLE, Jr.